Nov. 12, 1929.  E. F. PAWSAT  1,735,212
FLASH LIGHT SUPPORT
Filed Dec. 15, 1928
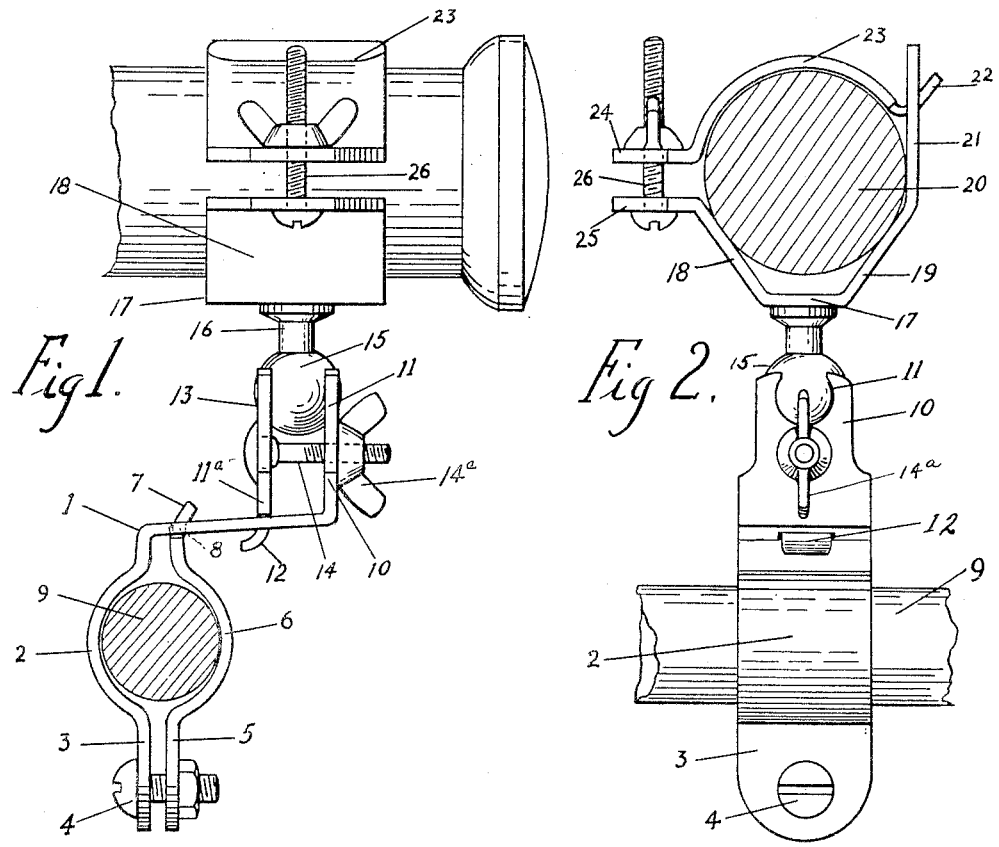
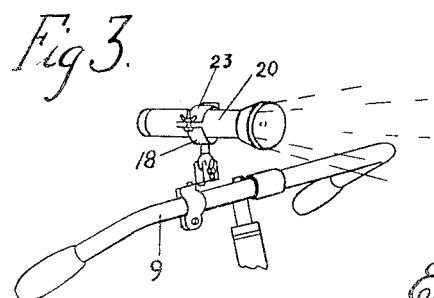
Inventor.
Ewald F. Pawsat,
By Arthur N. Ewald,
Attorney.

Patented Nov. 12, 1929

1,735,212

UNITED STATES PATENT OFFICE

EWALD F. PAWSAT, OF MAYSVILLE, KENTUCKY, ASSIGNOR TO WALD MANUFACTURING COMPANY, A CORPORATION OF KENTUCKY

FLASH-LIGHT SUPPORT

Application filed December 15, 1928. Serial No. 326,329.

The present invention relates to flash light supports, and has particular reference to the provision of a simple and adjustable device whereby a flash light may be mounted on the handle bar of a bicycle.

The principal object of the present invention is to provide in a device of the character specified in combination with two sets of clamping members, one of said sets being adapted to grip the handle bar of the bicycle and the other the barrel of a flash light, adjustable supporting means intermediate said clamping devices whereby the flash light when so mounted may be adapted for universal adjustability so that the rays from the flash light may be projected in any desired direction.

In the drawings:

Figure 1 is a side elevation of a flash light support constructed in accordance with this invention;

Figure 2 is a rear elevation thereof;

Figure 3 is a perspective of the device secured to the handle bar of a bicycle and carrying a flash light.

The numeral 1 indicates a plate of angular construction as clearly shown in Figure 1. The lower portion of said plate contains a semi-cylindrical section 2 beyond which is a flange 3 perforated for a bolt 4. Adapted to be secured to the plate 1 is a plate 5 having a complementary semi-cylindrical section 6. The plate 5 is provided with a perforated flange for the bolt 4, and a lip 7 which is arranged to be inserted in an opening 8 in the plate 1. The plates 1 and 5 may thus be clamped upon a bicycle handle bar 9.

The plate 1 is provided with a vertical extension 10, the upper end of which contains a circular notch 11. Adapted to be secured to the plate 1 is a plate 11ª having a lip 12 which extends through a slot in the plate 1. The upper end of plate 11ª is provided with a circular notch 13 corresponding to notch 11. The plate 11ª and extension 10 are perforated for a bolt 14 provided with a wing nut 14ª by means of which the plate 11ª and extension 10 may be clamped upon a ball 15, said ball being secured in the notches 11ª and 13. The ball 15 forms the lower end of a support 16 on the upper end of which a plate 17 is secured. Plate 17 has diverging walls 18 and 19, as clearly shown in Figure 2 of the drawings, adapted to receive the barrel 20 of a flash light. The wall 19 contains a vertical extension 21 which is provided with an opening for a lip 22 of a clamping plate 23. The plate 23 and wall 18 are provided with parallel flanges 24 and 25 which are perforated for a bolt 26.

From the foregoing description the nature and use of my invention will be apparent to those skilled in the art to which the same appertains.

The device being secured on the bicycle handle bar 9, as shown in Figure 3, and the flash light barrel being secured between walls 18 and 19 and the clamping plate 23, the latter becomes universally adjustable by reason of the bearing provided by the ball 15 in notches 11ª and 13. In order frictionally to secure the adjustment in any desired position the clamping pressure on the ball 15 adjusted by means of the bolt 14 and wing nut 14ª; this clamping pressure is, of course, premanently fixed so that the adjustment of the flash light is obtained against friction and securely retained in adjustment thereby.

Having thus fully described my invention what I claim as new and desire to secure by Letters Patent is:

1. A device of the character specified comprising in combination with a plate, means for securing said plate to a handle bar, cooperating members for securing the barrel of a flash light, a plate arranged to be hingedly secured to said first mentioned plate, circular notches in the ends of said plates, and a ball on one of said members arranged to be clamped in said notches between said plates.

2. A device of the character specified comprising in combination with a plate, means for securing said plate to a handle bar, cooperating members for securing the barrel of a flash light, a plate arranged to be hingedly secured to said first mentioned plate, circular notches in the ends of said plates, a ball on one of said members arranged to fit in said notches between said plates, and means for clamping said plates together frictionally to secure said ball.

EWALD F. PAWSAT.